United States Patent [19]
Tsang et al.

[11] Patent Number: 5,900,623
[45] Date of Patent: May 4, 1999

[54] ACTIVE PIXEL SENSOR USING CMOS TECHNOLOGY WITH REVERSE BIASED PHOTODIODES

[75] Inventors: Randy P.L. Tsang, San Francisco; Lawrence Tze-Leung Tse, San Jose; Timothy J. Donovan, Milpitas; King Cheung Yen, San Jose, all of Calif.

[73] Assignee: Chrontel, Inc., San Jose, Calif.

[21] Appl. No.: 08/909,162

[22] Filed: Aug. 11, 1997

[51] Int. Cl.⁶ ................................................... H01J 40/14
[52] U.S. Cl. ................................. 250/208.1; 250/214 R; 348/308
[58] Field of Search ........................... 250/208.1, 214 R, 250/214 P, 214 SW, 214.1; 356/218, 222; 348/308, 294, 298; 257/291, 298

[56] References Cited

U.S. PATENT DOCUMENTS

| | | | |
|---|---|---|---|
| 5,471,515 | 11/1995 | Fossum et al. | 377/60 |
| 5,576,763 | 11/1996 | Ackland et al. | 348/308 |
| 5,587,596 | 12/1996 | Chi et al. | 257/223 |
| 5,631,704 | 5/1997 | Dickinson et al. | 250/208.1 |

OTHER PUBLICATIONS

R.H. Nixon, S.E. Kemeny, C.O. Staller, E.R. Fossum, "FA 11.1: 256×256 CMOS Active Pixel Sensor Camera–on–a–Chip", Feb. 9, 1996, pp. 178–179 of handout for 1996 IEEE International Solid–State Circuits Conference.

Chye Huat Aw, Bruce A. Wooley, "FA 11.2: 128×128–Pixel Standard–CMOS Image Sensor with Electronic Shutter", Feb. 9, 1996, pp. 180–181 of handout for 1996 IEEE International Solid–State Circuits Conference.

Bryan Ackland, Alex Dickinson, "TA 1.2: Camera on a Chip", Feb. 8, 1996, pp. 22–25 of handout for 1996 IEEE International Solid–State Circuits Conference.

P.B. Denyer, D. Renshaw, Wang Guoyu, Lu Mingying, "CMOS Image Sensors For Multimedia Applications", 1993, pp. 11.5.1–11.5.4 of IEEE 1993 Custom Integrated Circuits Conference, Jan. 1993.

Eric R. Fossum, "CMOS Image Sensors: Electronic Camera On A Chip", 1995, pp. 1.3.1–1.3.9 of IEEE IEDM 1995, Jan. 1995.

*Primary Examiner*—Que T. Lee
*Attorney, Agent, or Firm*—Douglas J. Crisman; Flehr Hohbach Test Albritton & Herbert LLP

[57] ABSTRACT

An active pixel sensor implemented with CMOS technology that employs a plurality of photocells, each including a photodiode to sense illumination and a separate storage node with a stored charge that is discharged during an integration period by the photocurrent generated by the photodiode. Each photocell includes a switching network that couples the photocurrent to the storage node only during the integration period while ensuring that a relatively constant voltage is maintained across the photodiode during integration and non-integration periods. The transistors in the switching network operate in a forward active subthreshold region, ensuring linear operation and the diode voltage is clamped to a small positive voltage so that the diode is always reverse-biased. A source-follower generates a output signal correlated to the charge on the storage node that is coupled to column output circuitry that samples the signal. An operational scheme is employed wherein the storage node is first set to a defined voltage, the photocurrent is allowed to discharge the storage node and then the remaining charge coupled as a first signal to the column output circuitry, which samples and stores the first signal. The storage node is then reset to the same defined voltage and the resulting charge on the storage node is coupled as a second signal to the column output circuitry. The column output circuitry computes the difference of the first and second signals, which provides a reliable measure of the photocurrent during the integration period.

38 Claims, 5 Drawing Sheets

ACTIVE PIXEL SENSOR USING CMOS TECHNOLOGY WITH REVERSE BIASED PHOTODIODES

The present invention relates generally to active pixel sensors and, particularly, to an active pixel sensor design that realizes in a single chip fabricated using standard CMOS processes image capturing and various signal processing functions. An application of the sensors would be in a single chip CMOS camera.

BACKGROUND OF THE INVENTION

Thanks to the increasing processing power of integrated circuits the goal of achieving true multimedia communication is closer to becoming a reality. One major aspect of multimedia communication is providing a visual link for users. A key component needed to establish this visual connection is the video camera. To facilitate widespread utilization of visual communication, the video cameras that go with desktop PCs or other multimedia communication devices must be inexpensive, lightweight and power-efficient. One factor in the cost of a video camera is the degree of integration between the image capturing device and the associated application-specific image processing circuitry (costs are reduced when both are integrated on the same chip).

Traditionally, solid state based cameras are realized using charge-coupled devices (CCDs) as image capturing devices. Although high quality consumer products such as camcorders have been successfully built using CCDs, CCD technology is not compatible with standard DC processes. As a result, CCD-based cameras are relatively expensive. In addition, CCDs use high voltage clock signals, implying correspondingly high power dissipation levels. Therefore, there is much interest in building single chip cameras using standard CMOS processes, which would promote integration and low power consumption.

The prior art includes several types of single-chip, CMOS pixel sensor arrays. The principal difference between these array types is in the structure of their constituent photo cells. Generally, each array comprises a regular arrangement of photo cells, each of which provides a signal correlated to the amount of light failing on that cell. In color arrays, groups of three adjacent cells responsive to different primary wavelengths of light provide three respective signals that are combined to form a single color pixel. On monochromatic arrays, each cell generates a signal that alone forms a corresponding pixel.

Prior art CMOS sensor arrays have been implemented using photodiodes or photogates as light sensing elements/photocells. Operations of three prior art sensor arrays based on photogates or photodiodes are now described and their respective advantages and disadvantages are highlighted.

FIG. 1 depicts a generic realization of a photogate-based photocell 108 that can be used in an active pixel sensor. Each cell 108 has a photogate device PG, a storage node/capacitor SG, a transistor for charge transfer MT, a transistor to reset storage node potential MS, a row select transistor MR and a source follower transistor MSF. During an integration period in which the cell 108 collects photons, a positive potential is applied to the gate of the photogate device PG so that the region 122 of the p-type substrate 120 immediately under the gate is depleted of majority carriers. Photons that penetrate into the silicon during the integration period generate electron-hole pairs if they are suitably energetic. For those pairs that are generated in the carrier-depleted region 122, the electric field set up across the photogate device PG tends to sweep the electrons towards the oxide-silicon interface 124 and the holes to the substrate 120. The depleted junction area 122 also serves as a collection region for electrons generated in the substrate.

As the integration time progresses more electrons are created and accumulated at the oxide-silicon interface 124. During the integration period the signals XFER and RS are maintained at a low enough level that the transistors MT and MS are kept off. Towards the end of the integration period, while the gate PG is still at a positive potential, the device MS is pulsed on momentary by applying a high RS signal. This action returns the storage node SG to a potential that is about one threshold voltage below the supply voltage VDD. This "reset" value is read and stored by a readout circuit that includes the source follower transistor MSF and the row select transistor MR. During the readout operation, the ROW signal is asserted when it is time to read the sensor array row that includes the cell. When the ROW signal is asserted the OUTPUT signal is determined by the gate voltage of the source follower transistor MSF, which is in turn determined by the voltage across the storage node SG.

Following the reading of the reset value, the integration period is ended by returning the gate PG to a low potential value, for example VSS (typically at ground), and, at the same time, turning on the transistor MT by applying a positive XFER signal. These actions create a path connecting the storage node SG and the photogate region PG. Accumulated electrons will tend to flow from the gate PG towards the storage node SG, which has a higher potential. A voltage drop occurs at the storage node whose final value depends on the amount of electrons accumulated during the integration period and the capacitance at the storage node. This voltage is read by the readout circuit that includes the source follower transistor MSF and the row readout transistor MR as described above. The difference between this voltage and the previously stored "reset" value represents the total amount of light falling onto the sensor. This operation is repeated periodically for each pixel cell so that a time sampled scene is obtained.

The advantage of photogate-based cells is that a high charge-to-voltage conversion gain can be realized because of the low storage node SG capacitance. This in turn gives good low light performance because the noise contributions from the reset switch MS and the read amplifier MR are small due the cell's high conversion gain. A noise floor of 20 electrons to 40 electrons can be realized with this cell structure. A disadvantage with photogate devices is that they have lower quantum efficiency because light has to go through the polysilicon gate before creating electron-hole pairs. This degradation is particularly pronounced at smaller wavelengths and thus gives relatively poor blue color response.

FIG. 2 depicts a generic realization of a photodiode-based photocell 138 that can be used in an active pixel sensor array. The cell 138 consists of a reverse-biased junction diode PD acting as a light sensor, a transistor MS to reset a storage node ST and the diode potential, a source follower buffer transistor MSF and a row select transistor MR. Initially, a positive RS signal is applied to the gate of the transistor MS, which turns on as a result and resets the voltage across the diode PD to some preset value. The measurement of light energy is accomplished by turning off the transistor MS and letting the voltage across the diode PD discharge in response to the light energy failing on it. The amount of voltage change across the diode PD is proportional to the illumination level of the light to which it is exposed. After a predetermined integration time the voltage level across the diode PD is sampled at the OUTPUT node. The actual signal due to the amount of illumination falling on the cell 138 during the integration period is the difference between the voltage measured at the end of the integration period and the output voltage obtained after turning on the reset transistor MS to reset the diode voltage to the preset value. These steps essentially remove the uncertainty of the voltage drop across the source follower MSF in the actual signal. These steps also reduce the 1/f noise contribution.

1/f noise is noise which has most of its energy concentrated at lower frequencies. Its power spectral density has a form like K/f, hence the name, 1/f noise. It is also called flicker noise. The cause of 1/f noise in MOS devices is generally believed to be impurities and contamination at the gate oxide/silicon interface. Thus, 1/f noise originates from the devices employed in the MOS pixel sensor arrays.

An additional transistor can be inserted between the diode PD and the gate of transistor MSF to facilitate easier implementation of a shutter period control, wherein the shutter period is the photodiode integration time for each image frame. Using another transistor allows the shutter period to be controlled independently of the RS signal control.

The main disadvantage of the cell 138 is that its electron-to-voltage conversion gain is lower than that of photogate-based cells. This makes the relative contribution of noise due to the amplifier buffer MSF and the reset switch MS more significant at low light levels than in photogate-based cells. This effectively raises the cell's noise floor and degrades its performance relative to photogate-based cells at low levels of illumination. However, when the illumination level increases to the point where the contribution of the shot noise (statistical fluctuations in the current) becomes significant or dominant, the signal to noise ratio (SNR) for the photodiode cell 138 is higher than that of the photogate based cell 108. This is due to the fact that shot noise dominated SNR is proportional to the square root of the number of electrons accumulated and the photodiode has a higher quantum efficiency than photogate devices (i.e., the photodiode accumulates more electrons for a given level of light). In fact, the input dynamic range for the photodiode cell is the similar to that of the photogate based cell (where input dynamic range is defined as the range of input illumination levels to which the image sensor can respond within a fixed integration time). The only difference is that the dynamic range for photogate devices is from low illumination to moderately bright illumination levels and for photodiode devices is from moderate illumination to very bright illumination levels. Therefore, whether a photogate or photodiode cell should be used depends on the intended sensor array applications and the expected operating environment.

A third photocell design is the passive pixel cell. FIG. 3 shows one column of an active sensor array based on passive pixel cells 168. A passive pixel cell 168 has a very simple structure consisting of a photodiode PD with an associated capacitance $C_d$ and a transistor switch MR. The photodiodes from different rows are connected to a common column bus 170 through the switches MR1, MR2, . . . , MRx that are located inside each cell. Each column bus is coupled to the input of a charge amplifier AMP, which provides a signal $V_o$ that indicates the level of illumination collected by a one of the photodiodes PD. Before reading any of the photodiodes PD the amplifier is first reset and the resulting value $V_o$ stored. The photodiode PD of a selected row is then connected to the input of the charge amplifier AMP by closing the corresponding switch MR. Under ideal conditions the charge accumulated on the photodiode PD during the integration period is transferred onto the integration capacitor having capacitance $C_f$. This results in a change in the output voltage, $V_o$, with a value given by $$\frac{C_d}{C_f} \times V_d,$$

where $V_d$ represents the voltage discharged across the photodiode PD during the integration period. By choosing $$\frac{C_d}{C_f}$$

greater than one, a high electron-to-voltage conversion gain can be realized at the output $V_o$. In principle, the noise contribution of the reset switch $M_{reset}$ can be made negligible, in which case the main source of noise is the amplifier AMP. Real devices built with this type of pixel cell reportedly perform worse than the ideal case and their overall performance seems to be worse than the photogate based cells.

The following are some of the practical issues that need to be addressed in passive pixel cells.

Mismatches in charge injection and clock feedthrough due to the switches MR can affect fixed pattern noise (FPN) performance significantly. Further, in order to reduce the amount of signal charge loss to the column bus capacitance $C_{bus}$ the amplifier AMP has a very high minimum gain requirement. For example, for an overall voltage gain $$\frac{V_0}{V_d}$$

of two, where $V_d$ is the voltage drop across one of the photodiodes PD, and a typical $$\frac{C_{bus}}{C_d}$$

ratio of 40 to 50, an amplifier gain of 80 to 100 is needed to merely make the effective capacitance of the integration capacitor at the input of the amplifier AMP equal to $C_{bus}$. To further reduce the effect of $C_{bus}$ on signal loss, an amplifier gain of a few hundred to a thousand is needed. Coupled with the large $C_{bus}$ at the input of the amplifier AMP, this can lead to stability problems. All of these issues complicate the overall design. In addition, increasing the resolution, and thus the size of array, increases the $$\frac{C_{bus}}{C_d}$$

ratio further, which only exacerbates the gain and stability requirement. Therefore, this topology does not scale well with technology.

SUMMARY OF THE INVENTION

In summary, the present invention is an active pixel sensor that realizes in a single chip employing standard CMOS processes an image capturing function and various signal processing functions while providing high sensitivity and low fixed pattern noise (FPN) through special circuit techniques and photo cell structure.

The preferred embodiment uses photodiode-based photocells instead of photogate-based photocells. As a result, the preferred embodiment has the superior quantum efficiency of photodiodes, particularly for smaller wavelengths. At the same time, the preferred embodiment provides high electron-to-voltage conversion gain. Thus, as compared to photogate-based cells, the preferred embodiment has similar low light sensitivity and provides significantly better SNR performance for cells covered with blue & green color filters (in which wavelengths photogate-based cells are inefficient).

In particular, the present invention is an active pixel sensor that comprises a plurality of photocells, each of which includes a photodiode and a storage device. The photodiode, which is reverse-biased, generates a photocurrent that is proportional to the illumination falling on the photocell. The storage device, which is coupled to and distinct from the photodiode, has a stored charge that is discharged during an integration period as a function of the photocurrent generated by the photodiode during that period. The amount of the stored charge discharged during the integration period determines the magnitude of the output signal generated by the photocell.

In the preferred embodiment, a relatively-constant diode voltage is maintained across the photodiode during the integration period. The diode voltage is also clamped at all other times to a small, positive (reverse-bias) voltage to prevent blooming, which results when the photodiode becomes forward-biased. Under normal operating conditions, the reverse-biased voltage is about 1.5V±200 mV. Under abnormally bright illumination (up to a few million times brighter than the normal operating condition), the reverse-biased voltage across the photodiode is still clamped to a voltage that is greater than zero volts so that the diode remains reverse biased.

The present invention includes a switching network that comprises two n-channel transistors. The first n-channel transistor (N1) is configured to couple the cathode of the photodiode to a small, positive voltage only during a non-integration period that is complementary to the integration period. This first transistor enables the photocurrent generated during the non-integration period to bypass the storage device and instead flow through the first transistor. The second n-channel transistor (N2) is configured to couple the cathode of the photodiode to the small, positive voltage only during the integration period. This second transistor enables the photocurrent generated during the integration period to discharge the storage device instead of flowing through the first transistor. This switching network ensures that the diode voltage remains relatively constant regardless of whether the photocurrent is discharging the storage node (during the integration period) or flowing with no effect on the storage node (during the non-integration period).

In the preferred embodiment the first transistor has a gate, drain and source coupled to an SCB signal, a reset voltage supply node and the cathode of the photodiode. The second transistor has a gate, drain and source coupled to an SC signal, a storage node and the cathode of the photodiode. The storage node is coupled to one terminal of the storage capacitor. The SC and SCB signals are substantially-complementary and are generated so that the first and second transistors operate in the active, sub-threshold region. Preferably, the SC and SCB signals are generated so that the SCB signal makes a high to low transition just after the SC signal makes a low to high transition, ensuring that the diode voltage remains stable during transitions between the non-integration and integration periods.

A preferred embodiment includes a control signal generation (CSG) circuit that generates the SC and SCB signals. This CSG circuit includes a biasing network that, based on a bandgap reference, generates a top reference voltage (VTOP) level and a bottom reference voltage (VBOT) level. The VTOP and VBOT levels are regulated so that the VTOP level is at approximately 2.1 volt and the VBOT level is at approximately 1.5 volt. The CSG circuit also includes a combinational network that, in response to activation of an integrate signal, generates the SC and SCB signals so that the SC signal rises to the VTOP level shortly before the SCB signal falls to the VBOT level, and, in response to the deactivation of the integrate signal, generates the SC and SCB signals so that the SCB signal rises to the VTOP level shortly before the SC signal falls to the VBOT level.

The present invention also incorporates column output circuitry coupled to the output of the photocell that uses correlated double sampling to generate a pixel output signal that corresponds to the photocurrent generated during the integration period, corrected for the parasitic effects of the circuit elements between the storage node and an output signal amplifier. The output circuitry is configured in a first mode so that it samples and holds a first signal corresponding to the charge on the storage node at the end of the integration period, including parasitic effects. Then, in a second mode, the output circuitry samples a second signal corresponding to a reference voltage one the storage node at the beginning of the integration period, including the parasitic effects, and subtracts the first signal from the second signal so as to provide the corrected pixel output signal.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 4:
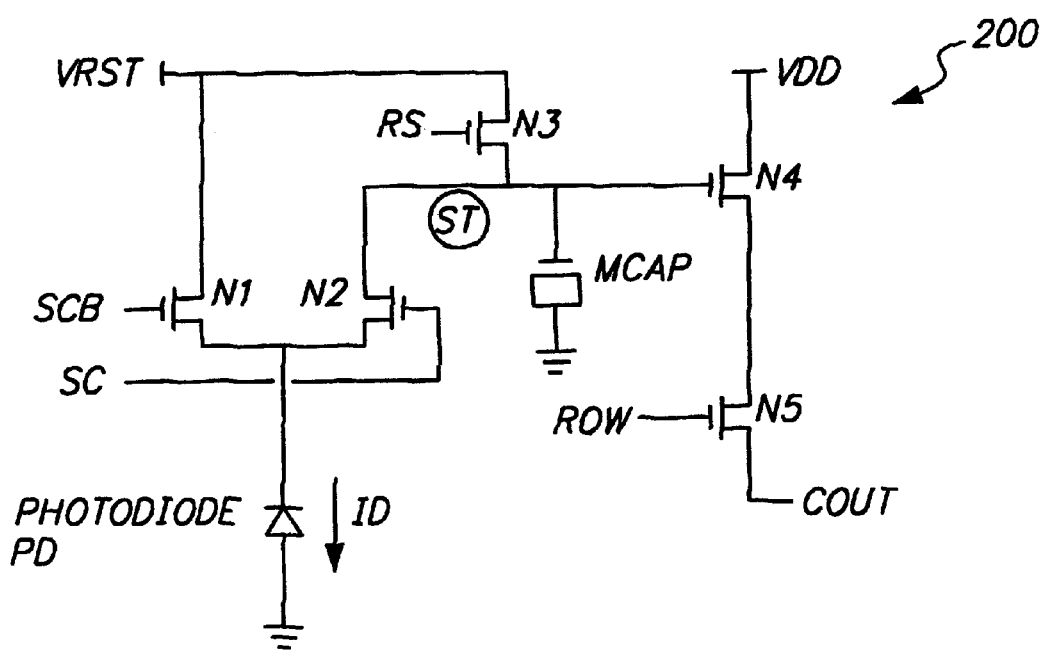
FIG. 4 is a schematic diagram of a photo cell implemented in accordance with the present invention that can be employed in an active pixel sensor.

FIG. 4 is a schematic diagram of a photocell 200 implemented in accordance with the present invention that can be employed in an active pixel sensor. The preferred photocell 200 includes five n-channel, enhancement-mode, MOS transistors N1, N2, N3, N4 and N5; a photodiode PD and a MOS capacitor MCAP. The transistors N1 and N2 compose a differential pair, the transistor N3 is a reset transistor, the transistor N4 is a source follower and the transistor N5 is a row select transistor. The capacitor MCAP is implemented as a MOS transistor with grounded source and drain operating in the triode region. External signals coupled to the photocell 200 include a positive (between 3.3V and 5V) power supply voltage VDD, a positive high voltage signal VRST, a pair of differential signals SC and SCB (an abbreviation for "SC-bar"), a reset signal RS and a row select signal ROW. The output of the preferred photocell 200 is provided via the signal COUT.

One end of the photodiode PD is connected to the most negative potential (i.e., GND) and the other end is connected to the sources of the pair of differential transistors N1 and N2, which are driven respectively by the differential signals SCB and SC. The drain of the transistor N1 and the drain of the reset transistor N3 are connected together to the VRST signal. The signal RS is connected to the gate of the transistor N3 and so determines whether that transistor is on or off. The source of the reset transistor N3 and the drain of the transistor N2 share a common diffusion region ST. The gate of the capacitor MCAP is connected to the nods ST, the potential at which is maintained at a level that ensures that the capacitor MCAP turns on for normal operation. The node ST is also connected to the gate of source follower transistor N4, whose source is linked to the column bus through the row select transistor N5, whose source provides the column output signal COUT.

In the preferred embodiment the cell 200 operates in integration, reset and readout modes that enable illumination falling on the cell to be measured with high sensitivity while eliminating measurement noise that, among other things, causes FPN in the resulting output signals. In the integration mode the internal storage node ST is first reset to the VRST voltage level and then, during a predetermined integration period, photons are collected by the photodiode PD, causing a diode current $I_d$ to flow, which discharges the capacitor MCAP. At the end of the integration period the ROW signal is asserted in a first readout mode so that a voltage representing the amount of charge remaining on the capacitor MCAP (which is a function of the collected photons) can be read on the column output signal COUT and then sampled and stored by column output circuitry (not shown). In the reset mode the internal storage node ST is again set to the VRST voltage level in exactly the same manner as in the integration mode. In the readout and reset modes the storage node ST is isolated from any diode current $I_d$ that might flow. The ROW signal is then re-asserted in a second readout mode so that the contribution of the various circuit elements (except for the photodiode) to the charge on the ST node is reflected in the COUT signal, which is also sampled by the column output circuitry. The second readout period is concluded by allowing the column output circuitry to subtract the first signal from the second signal, the difference of the two signals indicating the actual average photo current generated during the integration period absent most if not all spurious circuit and measurement effects. The operation of the preferred embodiment is now described in detail.

Regardless of the operational mode, a photocurrent $I_d$ is generated as a result of photon flux entering the photodiode PD and converted into an electron stream. Depending on the states of the switches N1 and N2, this current $I_d$ can either flow through the transistor N1 to the power supply VRST (during non-integration modes) or through the drain of the transistor N2 to the node ST (during integration). The states of the switches N1 and N2 are determined by the signals SC and SCB. How these signals are generated is now described in reference to FIG. 5A.

Figure 5A:
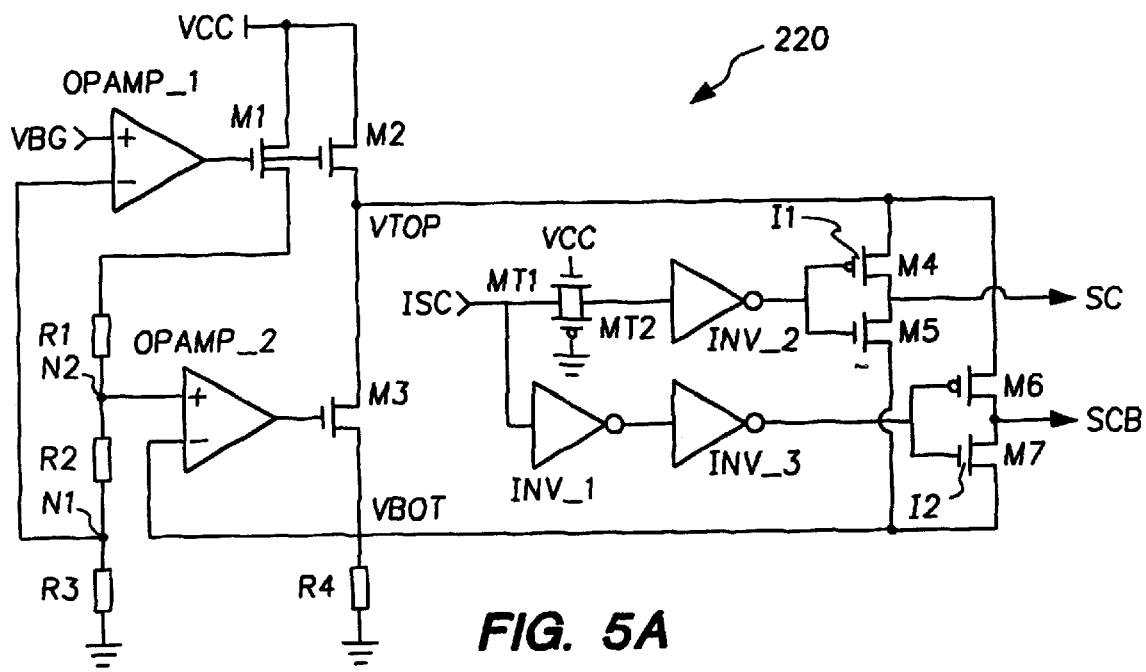
FIG. 5A is a schematic diagram of a preferred circuit for generating the SC and SCB signals used by the photo cell of FIG. 4.

FIG. 5A shows a preferred embodiment of an SC/SCB generation circuit 220 that generates the SC and SCB signals of FIG. 4. The circuit 220 includes two operational amplifiers (op amps) OPAMP_1, OPAMP_2; three n-channel transistors M1, M2, M3; transmission gates MT1, MT2; two inverting buffers I1, I2 formed respectively from the p-channel transistors M4, M6 and the n-channel transistors M5, M7; and four resistors R1, R2, R3, R4; and three inverters INV1, INV2, INV3.

The op amp OPAMP_1 has a non-inverting input coupled to a voltage reference signal VBG derived from a bandgap reference, an inverting input that is coupled to a node N1 between the resistors R2, R3 and an output that is coupled to the gates of the transistors M1, M2. The op amp OPAMP_2 has a non-inverting input coupled to a second voltage reference established at the node N2 by the source voltage of the transistor M1 and a voltage divider consisting of the resistors R1, R2, R3; an inverting input coupled to a node VBOT and an output that is coupled to the gate of the transistor M3. The transistor M1 has a drain that is coupled to a VCC node (at approximately 5V) and a source that is coupled to the resistor R1. The transistor M2 has a drain that is coupled to the VCC node (at approximately 5V) and a source that is coupled to a node VTOP that provides a regulated voltage coupled to the pullup transistors M4, M6 of the invertors I1, I2. The transistor M3 has a drain that is coupled to the node VTOP and a source that is coupled to a node VBOT that provides a regulated voltage to the pulldown transistors M5, M7 of the inverters I1, I2.

Figure 1:
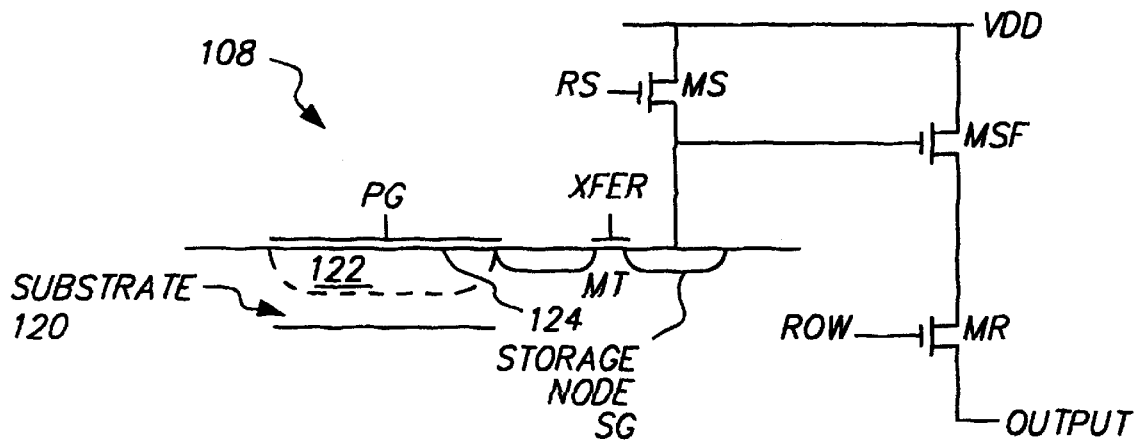
FIG. 1 is a schematic diagram of a photogate cell structure that is employed in prior art active pixel sensors.
Figure 2:
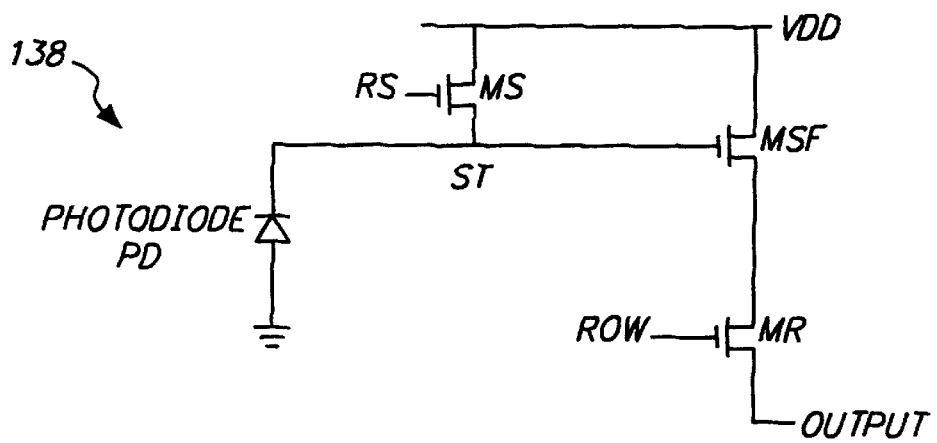
FIG. 2 is a schematic diagram of a photodiode cell structure that is employed in prior art active pixel sensors.
Figure 3:
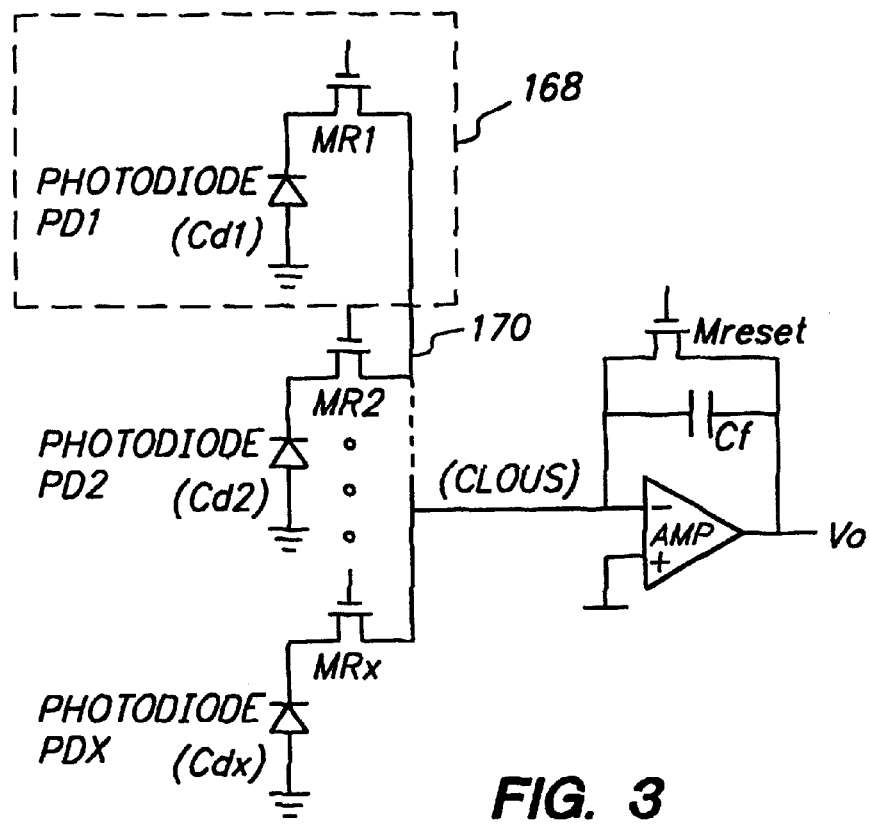
FIG. 3 is a schematic diagram of a passive photodiode-based cell structure that is employed in prior art active pixel sensors.

Using conventional feedback principles, the op amp OPAMP1 and the resistors R1, R2, R3 set the gates of the transistors M1, M2 to a stable voltage level that determines the regulated voltage level at the node VTOP and the voltage at the node N2. Using the same feedback principles, the op amp OPAMP2 and the resistor R4 determine the regulated voltage level at the node VBOT. In the preferred embodiment, the voltage level at the VTOP node is 2.1V and the voltage level at the VBOT node is 1.5V. The voltage swing between the STOP and VBOT voltages (which determines the swing in the SC and SCB signals at the beginning of the integration mode) is chosen to be no larger than necessary so that clock feedthroughs at the node ST (FIG. 1) through the gate-drain capacitance $C_{gd}$ of the transistor N2 are minimized.

The VTOP and the VBOT voltages are used to set the levels of the SC and SCB signals in response to an integration mode signal ISC, which is coupled to the transmission devices MT1, MT2 and the input of the inverter INV_1. The transmission gate MT1/MT2, the inverter INV_2 and the inverter/buffer I1 generate the SC signal as a delayed version of the ISC signal such that, when the ISC signal is high (i.e., at VCC) the SC signal is at the VTOP voltage and when the ISC signal is low (i.e., at 0V) the SC signal is at the VBOT voltage. The inverters INV_1, INV_3 and the inverter/buffer I2 generate the SCB signal as a delayed, inverted version of the ISC signal such that, when the ISC signal is low (i.e., at 0V) the SCB signal is at the VTOP voltage and when the ISC signal is high (i.e., at VCC) the SCB signal is at the VBOT voltage. The delay through the transmission gate MT1/MT2 is adjusted so that it matches that of INV_1. The inverters I1 and I2 are regular inverters (with adequate drive) except that they operate across VTOP and VBOT. The inverters INV_2 and INV_3 are identical and generate slower rising than falling edges. These circuit attributes enable the signals SC and SCB to be make before break (i.e., at the beginning of the integration period the signal SCB drops slightly after the signal SC rises and at the end of the integration period the SC signals drops slightly after the signal SCB rises). During the integration period the signal ISC and therefore the SC signal is high. During the readout period the signal ISC and therefore the SC signal is low. The timing of the SC and SCB signals is now described in reference to FIG. 5B.

Figure 5B:
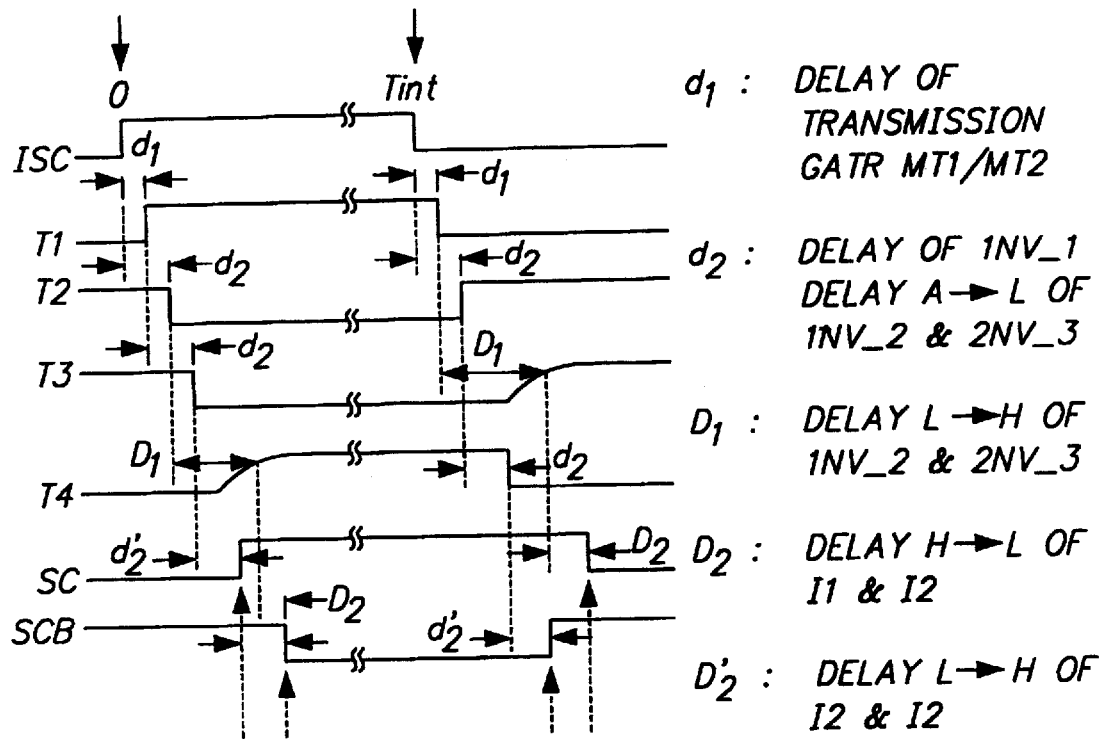
FIG. 5B is a timing diagram of signals associated with different delays through the SC and SCB signal-generating circuit of FIG. 5A.

Referring to FIG. 5B, there is shown a timing diagram of signals associated with different delays through the transmission gate MT1/MT2 and the inverters INV_1, INV_2, INV_3, I1 and I2 of FIG. 5A for different states of the ISC signal. The transmission gate MT1/MT2 has a delay d1 and the inverter INV_1 has a delay d2, which is also associated with the delay through the inverters INV_2, INV_3 for high to low output signal transitions. For low to high output transitions, the inverters INV_2, INV_3 have a delay of D1. For high to low output transitions, the inverters I1, I2 have a delay of D2; whereas, for low to high output transitions, they have a delay of d2'. FIG. 5B shows voltage versus time profiles of the ISC, SC and SCB signals, as well as of signals T1 (representing the delay path d1+d2+d2'), T2 (representing the delay path d2+D1+D2), T3 (representing the delay path $T_{int}+2d_1+d_2$') and T4 (representing the delay path $T_{int}+d1+D1+D2$). In these expressions, Tint is the integration time. Given these definitions, the delay between the rise of the SC signal and the fall of the SCB signal is equal to the difference of the delays T2 and T1 and the delay between the rise of the SCB signal and the fall of the SC signal is equal to the difference of the delays T4 and T3.

Referring again to FIG. 4, the cell 200 enters the integration mode when the signal SC goes high (to the VTOP voltage level) and the SCB signal goes low (to the VBOT voltage level). During this transition it is important that the voltage across the photodiode PD experiences minimal disturbance. The preferred embodiment minimizes these disturbances in at least two ways. First, as mentioned in reference to FIG. 5A, the signals SCB and SC that respectively drive the gates of the transistors N1 and N2 are make-before-break signals. As a result, during the transition to the integration mode there is no point in time when both of the transistors N1 and N2 are off, which would, at best, change the voltage across the diode and, at worst, bring the photodiode into forward bias with disastrous results.

Second, throughout the non-integration period, and at the very beginning of the integration period, the respective drains of the transistors N1 and N2 are at the VRST level. As the differential transistors N1 and N2 are identical, during the transition to the integration mode there is no change in the voltage across the photodiode PD. Note that this is made possible by bootstrapping the reset signal RS to a high voltage level $V_{HI}$ that is more than a threshold above the VRST level. Thus, when the RS signal is asserted at the very beginning of the integration period the transistor N3 passes the VRST voltage through to the transistor N2.

During the integration period, the signal SC is at the VTOP voltage level and the signal SCB is at the VBOT voltage level. As a result, the photocurrent $I_d$ that is generated by the photodiode PD passes through the transistor N2 and discharges the storage node capacitor MCAP. Due to the current level generated by the photodiode, the transistor N2 operates in the active region of the sub-threshold mode and functions as a unity gain current amplifier for the photocurrent $I_d$. A relatively constant reverse-biased voltage of magnitude VTOP–$V_{gs}$ (of the transistor N2) is established across the photodiode PD throughout integration, which ensures better linearity in the photodiode's performance.

As the integration period progresses the full magnitude of the photocurrent $I_d$ generated by the photodiode PD discharges the storage node capacitor MCAP, which was charged to the VRST level at the beginning of integration through the assertion of the reset signal RS. The rate of discharge is proportional to the photocurrent $I_d$ and therefore the illumination level at the cell 200. A high electron-to-voltage conversion gain is realized by the cell 200 as the storage node capacitance MCAP can be made much smaller than the capacitance associated with the photodiode area. Preferably, the storage node capacitor MCAP is implemented as a MOSFET capacitor to reduce leakage current and area.

As mentioned above, the storage node ST can be reset to the VRST level through the reset transistor N3 in response to the reset signal RS, which, when active, is bootstrapped by a suitable charge pump to the $V_{HI}$ voltage level. The pumped RS signal enables the ST node to be rapidly reset and allows a higher VRST level to be used, which improves the dynamic range of the cell 200. Antiblooming (blooming refers to bright spots on the display caused by large currents generated when the photodiode PD is momentarily forward-biased) is achieved by clamping the reverse-biased voltage across the photodiode so that it is no less than VBOT–$V_{gs}$ (the gate-source voltage of the transistors N1, N2), which is greater than 0V.

In the readout mode the amount of charge remaining on the node ST following the integration period (representing the received illumination) is read out onto the column output signal COUT when the ROW signal is asserted. The readout operation of the cell is described in greater detail in reference to FIGS. 6 and 7.

Thus the preferred cell 200 provides high electron-to-voltage conversion gain as well as better quantum efficiency by using a photodiode as its light sensor. Better sensor linearity is obtained by maintaining a relatively constant reverse biased voltage across the photodiode. An increase in dynamic range is realized by increasing the reset voltage level through the utilization of a charge pump circuit to pump the reset signal RS.

It has already been described how the present invention solves some of the problems associated with traditional sensor arrays based on photogates and photodiodes. Another common problem of sensor arrays is spatial noise, which results from spatial variations between pixel cells in an array that are manifested itself as pattern noise in the image. Spatial noise is one of the major sources of degradation in image array performance. Spatial noise is often due to photo response non-uniformity, which results from the gain variations between photocells and column amplifiers when the photo sensors are illuminated. The magnitude of this form of spatial noise is signal-dependent. Another type of spatial noise is fixed pattern noise (FPN), which is a measure of the variations between pixels in an array when the photo sensors are in the dark. It is usually caused by mismatches between pixel cell $V_{gs}$ drops, mismatches in voltage drops across column read amplifiers and mismatches between charge injections and clock feedthroughs at sensitive nodes as well as mismatches in dark currents. In order to reduce this FPN the preferred embodiment performs correlated double sampling (CDS) to reduce pixel cell voltage drop and column read amplifier voltage drop differences. In addition, the preferred embodiment pays special attention to canceling the effect of charge injections and clock feedthroughs that can degrade the FPN performance. It is now described in reference to FIGS. 6 and 7 how the present invention performs CDS in the context of a pixel sensor array.

Figure 6:
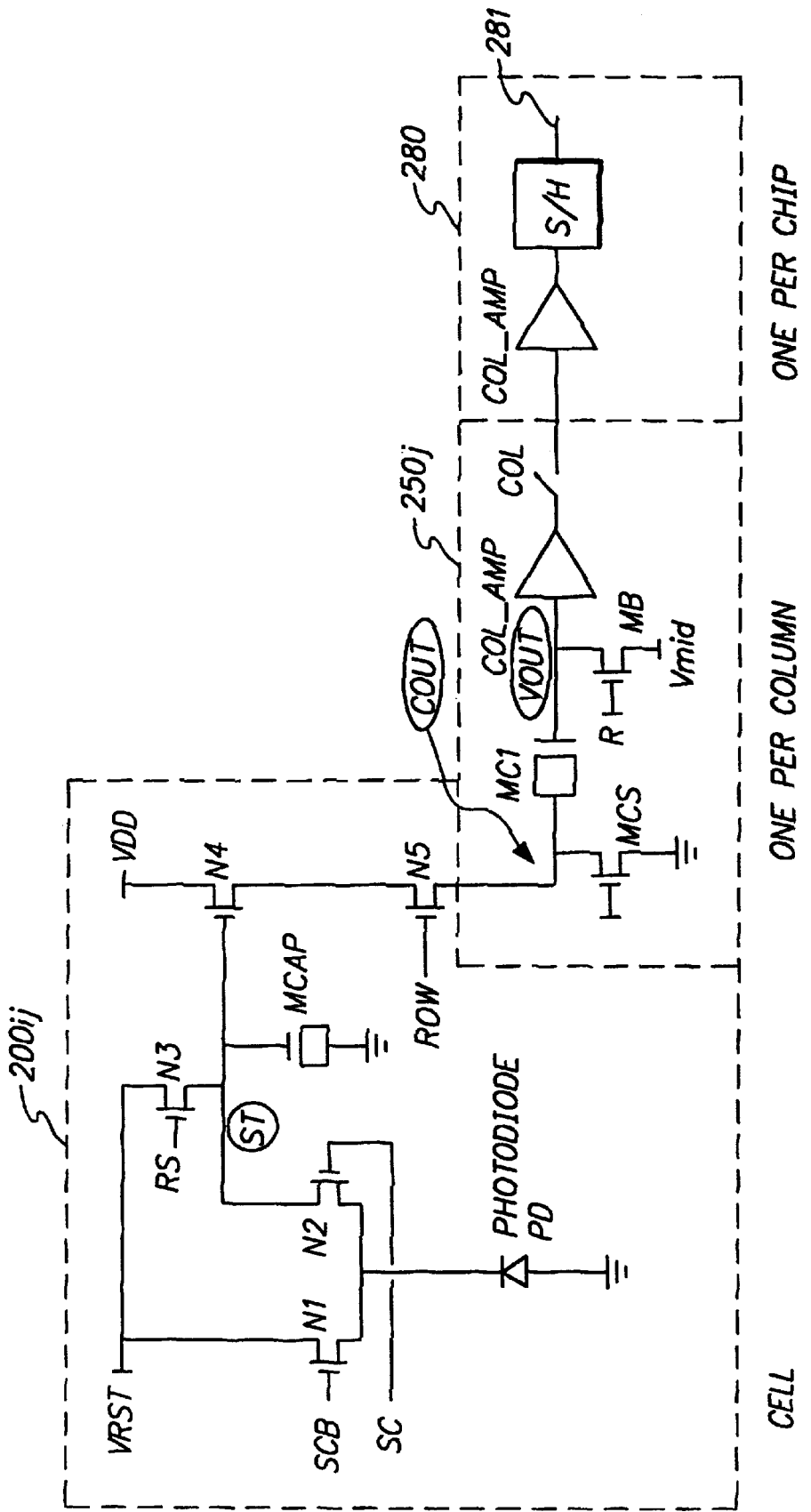
FIG. 6 is a block diagram of a preferred active pixel sensor employing the photo cell of FIG. 4.

FIG. 6 is a schematic diagram of a representative portion of a sensor array including a cell 200ij, where "i" and "j"

correspond, respectively, to generic row and column indices, a column output circuit 250j used by all of the cells 200xj, where "x" represents the range of row indices, and a final sample and hold amplifier block 280 used by all of the cells 200xy, where "y" represents the range of column indices. The operation of the sensor array of FIG. 6 is described in reference to FIG. 7, which is a timing diagram of the signals RS, SC, ROW, R[1], R[2], etc., and col[1], col[2], etc. The signals RS, SC and ROW have already been described. Each of the signals R[y], when asserted, causes the output signal COUT$_x$ from a particular cell 200xj to be coupled to the corresponding column output circuit 250j. Each of the signals col[y], when asserted, causes the output signal from the column output circuit 250y to be coupled to the final sample and hold amplifier block 280.

The column output circuit 250 includes a current bias transistor MCS, a MOS capacitor MC1, a voltage bias transistor MB and a column amplifier (col amp) with a switched output. The current bias transistor MCS, which is comparatively large, is always on as its gate is tied to a current bias signal. The source of the transistor MCS is grounded and its drain is coupled to the COUT node, which enables the transistor MCS to determine the current flowing in the source follower N4 and the row select transistor N5 when the ROW signal is asserted. The capacitor MC1 acts as a sample and hold device that acts between the COUT and VOUT nodes. In the preferred embodiment, the capacitor MC1 is implemented as a MOSFET operating in the triode region (also referred to as the linear region). This implementation substantially reduces the area needed for the capacitor MC1, especially in a standard CMOS process where double poly is not available. Furthermore, prior art circuits that implement a similar sample and hold function employ two capacitors, which occupy more chip area than the preferred implementation. The voltage bias transistor MB has a gate, drain and source coupled, respectively, to one of the R signals, the VOUT node and a bias voltage $V_{mid}$. In the preferred embodiment, $V_{mid}$ is approximately 3.2V. When the R signal is high, the bias transistor MB attempts to pull the VOUT node down to the bias voltage $V_{mid}$. The amplifier block 280 includes a column buffer (col_buf and a sample and hold device S/H that provides the pixel output signals 281.

Figure 7:
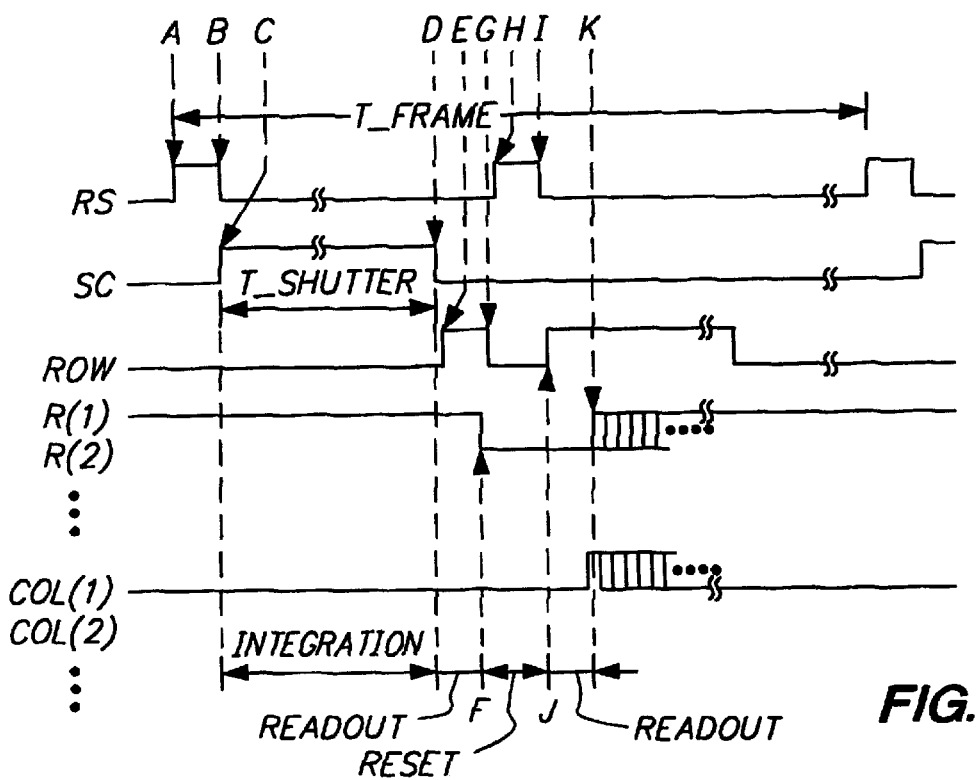
FIG. 7 is a timing diagram showing voltage versus time plots of a subset of the signals employed in the preferred active pixel sensor of FIG. 6.

Referring to FIG. 7, at the very beginning of the integration period (reference point A) the bootstrapped reset signal RS is driven from low to high. This causes the transistor N3 to reset the voltage across the storage node capacitor MCAP to the VRST level. After a short time (reference point B), the reset signal RS is driven low at which point the transistor switch N3 turns off. When the transistor N3 turns off a finite amount of charge is injected onto the storage node ST, which changes the total amount of charge stored by the capacitor MCAP. In addition, the change in the voltage at the gate of N3 due to the pulsed signal RS also affects the voltage that appears on the storage node ST after the switch N3 turns off at point B. Both of these effects, unless corrected-for, would introduce error in the reference level VRST, from which the storage node is discharged. How the preferred embodiment cancels this error is described below.

At point C, the signal SC is driven high and, shortly thereafter, the signal SCB is driven low, causing the transistor N1 to switch off and transistor N2 to switch on. After point C, the photocurrent $I_d$ is routed through the transistor N2 and, as a result, discharges the charge stored on the storage node capacitor MCAP. The transistor N2 stays on for a duration of T_shutter, which is as long as the signal SC is high. As soon as the signal SC goes low (at point D), the transistor N2 turns off, ending the integration period, and the transistor N1 turns on, causing the photocurrent to be steered through the transistor N1 rather than the transistor N2. The amount of charge lost from the storage node ST during the integration period is proportional to the photocurrent value and the length of shutter time, T_shutter. The output signal 281 from the sample and hold buffer 280 corresponds to this lost charge and therefore indicates the amount of illumination that fell on the cell during the integration period.

The signal 281 that represents this charge loss is obtained in the preferred embodiment by determining the effective change in voltage at the storage nods ST between point C, just before the discharge began, and point D, when discharge ended. In the preferred embodiment this is accomplished by first obtaining a representation of the voltage at the storage node ST after the discharge (at point D) and then obtaining a representation of the same voltage after returning the storage node ST to a state similar to that at the beginning of the discharge. Subtracting the second representation from the first gives the desired signal. How this procedure is accomplished in the preferred embodiment is now described.

After the SC signal goes low (point D), the ROW signal is asserted (point E), which turns on the row select transistor N5. Once the row select transistor N5 is on, a voltage level $V_s$ appears at the node COUT representing the charge remaining on the storage node ST after the integration period. While the ROW signal is high, the R signal is also high. As a result, the transistor MB pulls the input of the column amplifier (col_amp) down to the bias voltage $V_{mid}$. Just before the ROW signal makes a high to low transition (point G), the row select signal R makes a high to low transition (at point F), which causes the transistor MB to turn off, stabilizing the VOUT node at the bias voltage $V_{mid}$. The ROW signal then makes a high to low transition (point G), which turns off the transistor N5 and decouples the $V_s$ signal from the column output circuitry 250j. As a result, a voltage difference between the VOUT and COUT nodes of $V_s-V_{mid}$ exists across the capacitor MC1 just after point G.

Note that a jump in voltage occurs at the ST node when the transistor N4 turns on (as at point E). This jump is reflected in the voltage level $V_s$ that is stored across the capacitor MC1. The magnitude of this voltage jump is a function of $V_{gs(on)}$ (of the transistor N4), the gate-source capacitance $C_{gs}$ of the transistor N4, and a number of other parasitic effects. The voltage $V_s$ sampled onto the capacitor MC1 can be represented as in Eq. (1):

$$V_s = V_{RST}V_{e1} - V_{sig} + V_{e2} - V_{gsNr} - V_{dsNr}, \qquad \text{Eq. (1)}$$

where $V_{e1}$ represents the error due to charge injection and clock feedthrough of reset switch, $V_{e2}$ represents the error associated with turning on the transistors N5 and N4, and $V_{sig}$ represents the discharged voltage at the node ST due to the photo current $I_d$ during the integration period. To eliminate these undesirable errors in the signal $V_s$ the node ST of the cell is reset to the. VRST voltage level and read again as follows.

While the ROW signal is low (following point G), the RS signal is once again asserted (at point H), which causes the storage node ST to be reset to the VRST voltage level. The RS signal is left high for the same duration as between the time points A and B. This ensures that the storage node ST at time point G arrives at the same voltage level as that at time point B. When the RS signal is once again deasserted, the same amount of charge injection and clock feedthrough should be acquired on the storage ST as in the moment at the beginning of the integration period. When the ROW signal is once again asserted (at point J), the transistor N4 turns on (with the same effects on the node ST as previously described). The amount of charge on the ST node is reflected in an output signal S, that is coupled to the capacitor MC1 when the ROW signal is once again asserted (at point J).

Because at this point a voltage difference of $V_s-V_{mid}$ already exists across the capacitor MC1, the resulting output voltage level at the node COUT, denoted $V_r$, pulls the voltage at the input of the col_amp up to $(V_r-V_s+V_{mid})$. Note that the signal $V_r$ can be represented as in Eq. (2):

$$V_R V_{RST}+V_{\epsilon 1}+V_{\epsilon 2}-V_{gsNr}-V_{dsN5}. \qquad \text{Eq. (2)}$$

Thus, the difference signal $(V_r-V_s)$ gives the desired signal $V_{sig}$ representing the photocurrent $I_d$. When the appropriate col signal is asserted, the signal $(V_r-V_s+V_{mid})$ at the input of the col_amp is passed to the S/H block 280, which stores the signal. Subsequently (point K), the R signal makes a low to high transition, causing the transistor MB to turn on and short the input of the col_amp to the $V_{mid}$ node. This causes the col_amp's bias $(V_{mid})$ to be passed to the S/H block 280, which subtracts the bias from the previous stored signal $(V_r-V_s+V_{mid})$ to obtain a bias free signal voltage $V_{sig}$, which forms the final output 281.

The rows and columns of the pixel array are read in sequence, as indicated by the multiple transitions of R[y] and col[y] signals shown in FIG. 7. The cells composing the entire array are read within a frame time T_frame.

On summary, the preferred embodiment is an active pixel sensor implemented with CMOS technology that uses photodiode-based photocells instead of photogate-based photocells. As a result, the preferred embodiment has the superior quantum efficiency of photodiodes, particularly for smaller wavelengths. At the same time, the preferred embodiment provides high electron-to-voltage conversion gain. Thus, as compared to photogate-based cells, the preferred embodiment has similar low light sensitivity and provides significantly better SNR performance for cells covered with blue & green color filters (in which wavelengths photogate-based cells are inefficient).

A charge pump circuit is included in preferred embodiment to drive the reset switch N3 so that the storage node ST can be reset to a higher value than that imposed by the VCC power supply. This helps to increase the saturation voltage level and hence enhance the dynamic range of the preferred embodiment. In addition, correlated double sampling (CDS) is performed to reduce fixed pattern noise (FPN) due to mismatches in source follower (transistor N4) $V_{gs}$ and to reduce 1/f noise contributions as well. Furthermore, a clocking scheme is devised in order to cancel, to the first order, the errors due to charge injection and clock feedthroughs of various switches within the cell.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An active pixel sensor using CMOS technology, comprising:
    a plurality of photocells, each configured to sense illumination falling on a respective region of the active pixel sensor and to generate an output signal corresponding to the sensed illumination, wherein each of the photocells includes:
        a reverse-biased photodiode that generates a photocurrent that is proportional to the illumination falling on the photocell; and
        a storage device coupled to and distinct from the photodiode with a stored charge that is discharged during an integration period as a function of the photocurrent, the amount of the stored charge discharged during the integration period determining the output signal.

2. The active pixel sensor of claim 1, wherein the photodiode and the storage device are configured so that the photocell provides high electron-to-voltage gain.

3. The active pixel sensor of claim 1, wherein the storage device is a capacitor implemented as a MOS transistor with grounded source and drain operating in the triode region.

4. The active pixel sensor of claim 1, wherein a relatively-constant, reverse bias diode voltage is maintained across the photodiode during the integration period as well as between successive integration periods.

5. The active pixel sensor of claim 4, wherein the reverse bias diode voltage is clamped to a small positive voltage under normal operating conditions.

6. The active pixel sensor of claim 5, wherein the small positive voltage is approximately 1.5 V.

7. The active pixel sensor of claim 4, further comprising a switching network that includes:
    a first n-channel transistor that is configured to couple the cathode of the photodiode to a small, positive voltage only during a non-integration period that is complementary to the integration period and enables the photocurrent generated during the non-integration period to bypass the storage device and instead flow through the first transistor; and
    a second n-channel transistor that is configured to couple the cathode of the photodiode to the small, positive voltage only during the integration period and enables the photocurrent generated during the integration period to discharge the storage device instead of flowing through the first transistor.

8. The active pixel sensor of claim 7, wherein the reverse bias diode voltage is clamped to a second small positive voltage under normal operating conditions.

9. The active pixel sensor of claim 8, wherein the second small positive voltage is approximately 1.5V.

10. The active pixel sensor of claim 4, wherein the reverse-bias diode voltage is clamped to a small positive voltage that it is no less than $VBOT-V_{gs}$, where VBOT is a regulated voltage coupled to the gates of the first and second n-channel transistors during the non-integration and integration periods and $V_{gs}$ is the gate-source voltage of the first and second transistors, thereby preventing anti blooming on a display coupled to the active pixel sensor.

11. The active pixel sensor of claim 7, wherein:
    the first transistor has a gate, drain and source coupled to an SCB signal, a reset voltage supply node and the cathode of the photodiode; and
    the second transistor has a gate, drain and source coupled to an SC signal, a storage node and the cathode of the photodiode;
    wherein the storage node is coupled to one terminal of the storage capacitor, the SC and SCB signals are substantially-complementary signals that are generated so that the first and second transistors operate in the active sub-threshold region.

12. The active pixel sensor of claim 11, wherein the SC and SCB signal levels are generated so that, at the beginning of the integration period, the SCB signal makes a high to low transition just after the SC signal makes a low to high transition, ensuring that the diode voltage remains stable during transitions between the non-integration and integration periods.

13. The active pixel sensor of claim 11, wherein the SC and SCB signal levels are generated so that at the end of the integration period, the SC signal makes a high to low transition just after the SCB signal makes a low to high transition, ensuring that the diode voltage remains stable during transitions between the integration and non-integration periods.

14. The active pixel sensor of claim 11, wherein the SC and SCB signal levels are derived from a bandgap reference voltage.

15. The active pixel sensor of claim 11, wherein the first and second transistors are comparatively large devices that carry very small drain currents when operating in the active, sub-threshold mode.

16. The active pixel sensor of claim 11, wherein the reset voltage supply node provides a VRST voltage.

17. The active pixel sensor of claim 16, further comprising a reset transistor configured to pull the storage node up to the VRST voltage in response to the activation of a reset (RS) signal coupled to the gate of the reset transistor.

18. The active pixel sensor of claim 17, wherein the RS signal is at a positive voltage level that is higher than the VRST voltage by at least the threshold voltage of the reset transistor.

19. The active pixel sensor of claim 18, wherein the RS signal is generated by a charge pump circuit.

20. The active pixel sensor of claim 9, further comprising a control signal generation (CSG) circuit configured to generate the SC and SCB signals, the CSG circuit being responsive to an integrate signal and a bandgap reference and including:
    a biasing network that, based on the bandgap reference, generates a top reference voltage (VTOP) level and a bottom reference voltage (VBOT) level; and
    a combinational network that, in response to activation of the integrate signal, generates the SC and SCB signals so that the SC signal rises to the VTOP level shortly before the SCB signal falls to the VBOT level, and, in response to the deactivation of the integrate signal, generates the SC and SCB signals so that the SCB signal rises to the VTOP level shortly before the SC signal falls to the VBOT level.

21. The active pixel sensor of claim 20, wherein the VTOP level is at approximately 2.1 volt and the VBOT level is at approximately 1.5 volt.

22. The active pixel sensor of claim 1, further comprising column output circuitry configured:
    in a first mode to sample and hold a first signal corresponding to the amount of charge on the storage node at the end of the integration period, including parasitic effects; and
    in a second mode to:
        sample a second signal corresponding to the charge at the storage node at the beginning of the previous integration period, including the parasitic effects, and
        subtract the first signal from the second signal so as to provide the output signal representing just the charge discharged from the storage node during the integration period.

23. The active pixel sensor of claim 22, wherein the column output circuitry comprises:
    a voltage bias transistor with a drain, gate and source coupled respectively to a column output signal, a bias control signal and a bias voltage, such that, when the bias control signal is asserted, the drain is set to the bias voltage;
    a column amplifier with an input coupled to the drain of the bias transistor; and
    a sample and hold block with an input coupled to the output of the column amplifier and an output that forms the active pixel sensor output signal;
    wherein:
        in the first mode the sample and hold block stores the first signal value equaling Vsig+Vmid+Voffset, where "Vsig" represents the amount of the stored charge discharged during the integration period, "Vmid" is the bias voltage and "Voffset" represents voltage offsets in the pixel sensor; and
        in the second mode:
            the bias signal is asserted, causing the input of the column amplifier to go to Vmid while the output of the column amplifier and the input of the sample and hold block go to the second signal value equaling Vmid+Voffset bias; and
            the sample and hold block subtracts the second signal value from the first signal value, producing the output signal of Vsig.

24. The active pixel sensor of claim 22, further comprising:
    a source follower coupled to the storage node that provides a signal corresponding to the output signal on its source; and
    an output switching transistor with a gate, drain and source coupled, respectively, to a ROW enable signal, the source of the source follower and the input of the column output circuitry.

25. The active pixel sensor of claim 24, wherein the column output circuitry comprises a sample and hold capacitor implemented as a MOSFET transistor having a gate employed as one terminal of the capacitor and shorted gate and drain employed as the other terminal of the capacitor, one of the terminals being coupled to the source of the output switching transistor and the other of the terminals being coupled to the input of a column amplifier.

26. The active pixel sensor of claim 24, further comprising a reset transistor configured to pull the storage node up to a defined voltage level in response to the activation of a reset (RS) signal coupled to the gate of the reset transistor.

27. The active pixel sensor of claim 26, wherein:
    (1) just before the beginning of the integration period, the RS signal is pulsed, causing the reset transistor to set the storage node to the defined voltage level;
    (2) the SC signal is asserted to initiate the integration period during which the charge on the storage node is discharged;
    (3) the SC signal is deasserted after a shutter period to end the integration period;
    (4) the ROW signal is asserted to couple a first signal corresponding to the charge on the storage node at the end of the integration period, including parasitic effects, to column output circuitry, which samples and holds the first signal;
    (5) the ROW signal is deasserted;
    (6) the RS signal is pulsed, causing the reset transistor to set the storage node to the defined voltage level; and (7) the ROW signal is asserted to couple a second signal corresponding to the charge on the storage node at the beginning of the integration period, including the parasitic effects, to the column output circuitry, which samples the second signal and subtracts the first signal from the second signal so as to provide a corrected output signal.

28. An active pixel sensor method for use in each of a plurality of photocells, each configured to sense illumination falling on a respective region of an active pixel sensor and to generate an output signal corresponding to the sensed illumination, the method comprising the steps of:

storing a charge on a storage device within the photocell;

generating a photocurrent that is proportional to the illumination falling on the photocell using a photodiode within the photocell, the photodiode being distinct from the storage device; and discharging the storage node during an integration period as a function of the photocurrent, the amount of the stored charge discharged during the integration period determining the output signal.

29. The method of claim 28, further comprising the step of:

maintaining a relatively-constant, reverse bias diode voltage across the photodiode during the integration period as well as between successive integration periods.

30. The method of claim 29, further comprising the steps of:

coupling during a non-integration period that is complementary to the integration period the cathode of the photodiode to a small, positive voltage in such a manner that the photocurrent generated during the non-integration period bypasses the storage device; and coupling during the integration period the cathode of the photodiode to the small, positive voltage in such a manner that the photocurrent generated during the integration period discharges the storage device.

31. The method of claim 30, wherein the coupling of the photodiode to the diode voltage during the non-integration mode is determined by an SCB signal and the coupling of the photodiode to the diode voltage during the integration mode is determined by an SC signal.

32. The method of claim 31, wherein the step of generating the SC and SCB signals comprises generating the SC and SCB signals, so that, at the beginning of the integration period, the SCB signal makes a high to low transition just after the SC signal makes a low to high transition, ensuring that the diode voltage remains stable during transitions between the non-integration and integration periods.

33. The method of claim 31, wherein the step of generating the SC and SCB signals comprises generating the SC and SCB signals, so that, at the end of the integration period, the SC signal makes a high to low transition just after the SCB signal makes a low to high transition, ensuring that the diode voltage remains stable during transitions between the integration and non-integration periods.

34. The method of claim 31, wherein the step of generating the SC and SCB signals comprises:

generating a top reference voltage (VTOP) level and a bottom reference voltage (VBOT) level; and in response to activation of an integrate signal, generating the SC and SCB signals so that the SC signal rises to the VTOP level shortly before the SCB signal falls to the VBOT level, and, in response to the deactivation of the integrate signal, generating the SC and SCB signals so that the SCB signal rises to the VTOP level shortly before the SC signal falls to the VBOT level;

the SCB and SC signals being respectively coupled to first and second transistors configured to couple the photodiode to the diode voltage in response to activation of the SCB and SC signals, respectively.

35. The method of claim 34, wherein the VTOP level is at approximately 2.1 volt and the VBOT level is at approximately 1.5 volt.

36. The method of claim 28, further comprising the steps of:

in a first mode, sampling and holding a first signal corresponding to the amount of charge on the storage node at the end of the integration period, including parasitic effects; and in a second mode:

sampling a second signal corresponding to the charge at the storage node at the beginning of the previous integration period, including the parasitic effects, and subtracting the first signal from the second signal so as to provide the output signal representing just the charge discharged from the storage node during the integration period.

37. The method of claim 36, wherein the photocell includes column output circuitry comprising:

a voltage bias transistor with a drain, gate and source coupled respectively to a column output signal, a bias control signal and a bias voltage, such that, when the bias control signal is asserted, the drain is set to the bias voltage;

a column amplifier with an input coupled to the drain of the bias transistor; and a sample and hold block with an input coupled to the output of the column amplifier and an output that forms the active pixel sensor output signal;

wherein:

in the first mode the sample and hold block stores the first signal value equaling Vsig+Vmid+Voffset, where "Vsig" represents the amount of the stored charge discharged during the integration period, "Vmid" is the bias voltage and "Voffset" represents voltage offsets in the pixel sensor; and in the second mode:

the bias signal is asserted, causing the input of the column amplifier to go to Vmid while the output of the column amplifier and the input of the sample and hold block go to the second signal value equaling Vmid+Voffset bias; and the sample and hold block subtracts the second signal value from the first signal value, producing the output signal of Vsig.

38. The method of claim 36, comprising the steps of:

(1) just before the beginning of the integration period setting the storage node to a defined voltage level;

(2) initiating the integration period during which the charge on the storage node is discharged;

(3) ending the integration period;

(4) coupling a first signal corresponding to the charge on the storage node at the end of the integration period, including parasitic effects, to column output circuitry, which samples and holds the first signal;

(5) resetting the storage node to the defined voltage level; and (6) coupling a second signal corresponding to the charge on the storage node at the beginning of the integration period, including the parasitic effects, to the column output circuitry, which samples the second signal and subtracts the first signal from the second signal so as to provide a corrected output signal.

* * * * *

UNITED STATES PATENT AND TRADEMARK OFFICE
CERTIFICATE OF CORRECTION

PATENT NO. : 5,900,623
DATED : May 4, 1999
INVENTOR(S) : Tsang et al.

It is certified that error appears in the above-indentified patent and that said Letters Patent is hereby corrected as shown below:

In Column 14, line 53, Claim 10, please replace "anti blooming" with --antiblooming--;

In Column 15, line 45, Claim 20, please replace "fails" with --falls--.

Signed and Sealed this

Fifth Day of October, 1999

Q. TODD DICKINSON

Attest:

Attesting Officer

Acting Commissioner of Patents and Trademarks